Patented Jan. 13, 1925.

1,522,954

UNITED STATES PATENT OFFICE.

WALDEMAR O. HAMISTER AND VICTOR C. HAMISTER, OF CLEVELAND, OHIO, ASSIGNORS OF ONE-HALF TO THE GOODYEAR TIRE & RUBBER COMPANY, OF AKRON, OHIO, A CORPORATION OF OHIO, AND ONE-HALF TO NATIONAL CARBON COMPANY, OF NEW YORK, N. Y., A CORPORATION OF NEW YORK.

METHOD OF CURING RUBBER.

No Drawing.   Application filed October 30, 1922.   Serial No. 598,006.

*To all whom it may concern:*

Be it known that we, WALDEMAR O. HAMISTER, a citizen of the United States, and resident of Akron, Ohio, and VICTOR C. HAMISTER, a citizen of the United States, and resident of Cleveland, Ohio, have invented new and useful Improvements in Methods of Curing Rubber, of which the following is a specification.

Our invention pertains to the manufacture of rubber and it has particular relation to that step of the manufacturing process known as vulcanization in which the curing of the rubber is effected.

One object of our invention is to provide a novel method of introducing vulcanizing agents into a rubber compound. Another object of our invention is to provide a simple and inexpensive method whereby rubber may be cured without the aid of heat.

Heretofore, in the vulcanization of rubber by treatment with gases, such, for example, as hydrogen sulphide and sulphur dioxide, difficulty has been experienced in introducing the hydrogen sulphide into the rubber cement on account of the low solubility thereof. By our invention, we have provided a method of introducing any desired gas into the rubber cement, wherein the difficulties, which obtained by reason of the low solubility of the gas in rubber cement, are eliminated.

Another method of curing at present employed consists in passing a sheet of uncured rubber through a container filled with sulphur dioxide. This method is objectionable owing to the difficulty of sealing the gas chambers, especially in installations in which the cure must be continuous for continuously moving material. This difficulty is also avoided by our invention, because both gases which interact to effect the cure may if desired be introduced into the rubber in the milling process.

In practicing our invention, we take advantage of the gas absorbing properties of certain pigments or fillers, more particularly those of a carbonaceous nature. We have found, for example, that finely divided carbon may be saturated with a suitable gaseous vulcanizing agent, such as hydrogen sulphide, before being introduced into the rubber, which is usually accomplished by milling. As finely divided carbon is frequently employed in the manufacture of rubber as a pigment, and in order to toughen the stock, no new and undesirable or unnecessary elements are added to the rubber mixture by practising our invention. Sulphur dioxide, which reacts with hydrogen sulphide to produce the sulphur necessary to vulcanize the rubber, may be introduced in a similar manner if desired, but on account of the ready solubility of this gas, such treatment is considered unnecessary.

Although it is possible to utilize pigments or fillers, particularly in powdered form, other than carbon, it is highly desirable that an agent having a relatively high adsorptive capacity for gases be employed. This property is possessed to a marked degree by lampblack and other finely divided carbon which has been subjected to a treatment known as activation. The activation of carbon consists essentially in raising the crude or raw carbon to a temperature of approximately 800 to 900° C. in the presence of a limited amount of oxygen, in the form of steam, air, carbon dioxide, or equivalent reagents. When treated as described, the hydro-carbons present in the lampblack, or other raw carbon, are eliminated by a process of selective oxidation. This leaves a carbonaceous base or skeleton which possesses a relatively high adsorptive capacity for gases and is usually designated as "activated carbon."

In manufacturing rubber in accordance with our invention, we prefer to saturate activated carbon with hydrogen sulphide and to mill the same into the rubber, thus thoroughly mixing the rubber, the carbon and the gas. A cement is then made from the mixture by the addition of a relatively small quantity of a rubber solvent, such, for example, as benzol. An additional quantity of rubber solvent saturated with sulphur dioxide is mixed with the cement just prior to disposing the rubber in its finally desired position. For example, in rubberizing a quantity of fabric, the solvent saturated with the sulphur dioxide should be mixed with the cement containing the hydrogen sulphide but a very short time before applying the mixture to the fabric. As a short interval of time is necessary for the complete vulcanization of the rubber, it will not be vulcanized until after being placed in its final position on the fabric.

The rubber may also be cured by constructing a piece of material or an article such, for example, as rubberized fabric by spreading thereon cement containing carbon impregnated with hydrogen sulphide, permitting the same to dry, and subsequently passing it through a chamber containing sulphur dioxide, the interaction of which with the hydrogen sulphide produces the desired cure.

Our invention may likewise be applied to the manufacture of artificial leather in which a quantity of separated fibers are provided with individual rubber coverings and are then arranged in a matted formation in any desired shape. It is highly desirable in the manufacture of material of the character in question that the cure of the rubber be effected without heating to any great extent because the fibers in the material are likely to be charred and seriously damaged if raised to a high temperature, thus injuring the material. In manufacturing artificial leather, the carbon impregnated with the hydrogen sulphide should be introduced into the rubber solution prior to the deposition of the rubber on the individual fibers. The sulphur dioxide may be introduced thereto either before, during, or after the actual precipitation of the rubber on the fibers, or after the fibers are molded to form and dried.

It is desirable, in some instances, to heat the mixture of which the activated carbon forms a portion, at the time of adding the sulphur dioxide, in order to drive the hydrogen sulphide from the carbon to facilitate its interaction with the sulphur dioxide. Also, it may be desirable to impregnate a portion of the carbonaceous or other pigment or filler with hydrogen sulphide and another portion with sulphur dioxide, and mill both into the rubber, the cure being effected at any stage of the process by heating the material, thus driving the gases from the filler and into contact with each other.

Furthermore, if desired, a quantity of finely divided carbon or other pigment, or filler, having sufficient adsorptive capacity for gases, may be milled into the rubber compound, which is subsequently passed successively through chambers containing hydrogen sulphide and sulphur dioxide. The presence of the filler in the compound permits of thorough impregnation by the gases in a much shorter time than is necessary when it is not present.

Although we have set forth several slightly different forms which our invention may assume and have described in detail several applications thereof, it will be obvious to those skilled in the art that our invention is not so limited but that various minor modifications and changes may be made therein without departing from the spirit of our invention or from the scope of the appended claims.

What we claim is:

1. The method of treating rubber which comprises introducing a curing agent thereinto combined with a pigment.

2. The method of treating rubber which comprises introducing a curing agent thereinto by means of an activated pigment.

3. The method of treating rubber which comprises introducing sulphur thereinto by means of activated carbon.

4. The method of treating rubber which comprises introducing a rubber curing fluid thereinto by means of a solid carrying agent.

5. The method of treating rubber which comprises introducing a rubber curing gas thereinto by means of a pigment.

6. The method of treating rubber which comprises introducing a rubber curing gas thereinto by means of a pigment in powdered form.

7. The method of treating rubber which comprises introducing hydrogen sulphide by means of impregnated carbon, and subsequently treating the mixture with sulphur dioxide.

8. The method of treating rubber which comprises introducing into the rubber a pigment impregnated with hydrogen sulphide.

9. The method of treating rubber which comprises impregnating a quantity of carbon with hydrogen sulphide, milling the carbon into the rubber, making said rubber into a cement, and mixing therewith a quantity of rubber solvent containing a quantity of sulphur dioxide.

10. The method of treating rubber which comprises impregnating a quantity of carbon with hydrogen sulphide, milling the carbon into the rubber, making said rubber into a cement, mixing therewith a quantity of rubber solvent containing a quantity of sulphur dioxide, and heating the mixture.

11. The method of treating rubber which comprises introducing into the rubber hydrogen sulphide and sulphur dioxide by means of powder impregnated therewith.

12. The method of treating rubber which comprises milling a powder adapted to be activated into a rubber compound, and subsequently treating the compound with rubber curing gases.

13. The method of treating rubber which comprises milling a quantity of powder adapted to be activated into a rubber compound, and subsequently passing the compound successively through chambers containing hydrogen sulphide and sulphur dioxide respectively.

In witness whereof, we have hereunto signed our names in the presence of two subscribing witnesses.

WALDEMAR O. HAMISTER.

Witnesses:
F. A. LIND,
O. E. BEE.

VICTOR C. HAMISTER.

Witnesses:
JOHN FLEINSMITH,
H. A. WALKER.